3,522,033
METHOD OF INHIBITING WEED
GROWTH IN CORN
Ikuzo Kageyama and Keiichi Maruo, Toyonaka-shi, Japan, assignors to Daikin Kogyo Kabushiki Kaisha, Kita-ku, Osaka-shi, Japan
No Drawing. Continuation-in-part of application Ser. No. 333,198, Dec. 24, 1963. This application Nov. 6, 1967, Ser. No. 680,945
Claims priority, application Japan, Jan. 9, 1963, 38/884; Oct. 31, 1963, 38/64,208, 38/64,209
Int. Cl. A01n 9/20
U.S. Cl. 71—118                    9 Claims

ABSTRACT OF THE DISCLOSURE

Method of selectively protecting corn plants from undesirable weeds, which comprises applying to the area infested with the latter an effective amount of the herbicidal compound of the formula:

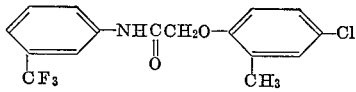

---

This invention is a continuation-in-part of our copending application Ser. No. 333,198, filed Dec. 24, 1963, now abandoned.

In contrast to other crops, the corn plant is generally sensitive to the conventional herbicides and tends to be injured considerably by the action thereof. When a known herbicide, such as sodium 2,4-dichlorophenoxyacetate, sodium 2-(2,4-dichlorophenoxy)ethanesulfate, or N-(3,4-dichlorophenyl - N',N' - dimethylurea is applied to the corn-growing area, considerable damage and the accompanying fall in the yields are unavoidable. Particularly, the pre-emergent soil application of such herbicide tends to form chlorosis in the sprouts, resulting in deformed leaves, poor growth, and poor yields. Some of the germinating plants die. Post-emergent application also inhibits the growth of the plants, although not so remarkable as compared with the pre-emergent application. Moreover, the post-emergent soil application is particularly injurious, as the plants take root shallow in the soil.

One object of this invention is accordingly to provide a novel method of eliminating undesirable weeds from the corn fields where no suitable herbicidal approaches have been developed yet.

Another object of the invention is to provide the most effective method of protecting corn plants from the undesirable weeds without causing any appreciable damage upon the plants to be protected.

Another object of the invention is to provide the most effective herbicidal method for the protection of corn plants from the undesirable weeds, which can be applied either pre-emergently or post-emergently without causing any harmful effects upon the plants to be protected.

Another object of the invention is to provide the most desirable herbicidal method for the protection of corn plants from the undesirable weeds, the once-a-year application of which is effective enough to protect the plants until the harvest titme.

A further object of the invention is to provide the most effective herbicidal method for the protection of corn plants from the undesirable weeds, which has no harmful effect upon human bodies and domestic and aquatic animals, and which displays marked and lasting herbicidal effect irrespective of climatic conditions.

The above and other objects of this invention are accomplished by applying to the corn fields 3-trifluoromethyl-2'-methyl-4'-chlorophenoxyacetanilide of the formula:

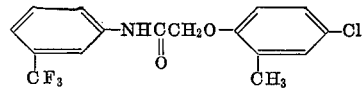

in the range of 5 to 40 grams per are.

The compound of the above formula is described by Thompson et al. in Botanical Gazette (107, 1946, p. 506), where it is disclosed that this compound displays ⅓ to ⅕ the inhibitory activity of 2,4-dichlorophenoxy acetic acid on kidney beans. As will be seen from such description, it is evident that the compound is quite poor in herbicidal capacity on the one hand, and on the other, that the compound displays a considerable chemical injury upon the plants to be protected. Moreover, there is no indication in Thompson et al. of the effective use of said compound for the protection of corn plants from the undesirable weeds.

The present inventors have carried out series of experiments in the effective use of the aforesaid 3-trifluoromethyl-2'-methyl - 4' - chlorophenoxyacetanalide and have found quite accidentally that despite a considerable chemical injury on most of the plants tested, said compound completely eliminates undesirable weeds not only in pre-emergent but in post-emergent application without causing any appreciable chemical injury upon the corn plants under examination. This unexpected selective herbicidal ability deserves specific attention, because the corn plant is generally known as quite sensitive to chemical injury. This invention is based upon such a new discovery.

The 3-trifluoromethyl-2'-methyl-4'-chlorophenoxyacetanilide which is employed in this invention is of crystalline powder having a melting point of 146° to 146.5° C. It is insoluble or hardly soluble in water, petroleum, carbon tetrachloride, etc., but easily soluble in alcohol, acetone, tetrahydrofuran, N-methyl pyrrolidone, dimethylformamide, γ-butyrolactone, etc.

The 3-trifluoromethyl-2'-methyl-4'-chlorophenoxyacetanilide of this invention can be easily synthesized according to various methods. For instance, said compound may be prepared by reacting 2-methyl-4-chlorophenoxy acetic acid halide with 3-trifluoromethylaniline. The reaction is carried out at a temperature between 0° to 40° C., preferably between 0° to 5° C., in the presence of a solvent, such as acetone, benzene, chloroform, or tetrahydrofurane. Hydrogen chloride acceptors, such as pyridine, sodium carbonate, and the like, may be added to accelerate the reaction. The desired 3-trifluoromethyl-2'-methyl-4'-chlorophenoxyacetanilide can also be obtained by conventionally reacting 2-methyl-4-chlorophenoxy acetic acid per se or its anhydride with 3-trifluoromethylaniline.

The herbicidal compositions of this invention having said 3-trifluoromethyl - 2' - methyl-4'-chlorophenoxyacetanilide as the main effective ingredient are applied to the corn plant field at rates varying from 5 to 40 grams per are, preferably in the range of 7 to 20 grams per are, on the basis of the main effective ingredient. Application of higher than 40 grams per are tends to increase chemical damage on the plants to be protected, and that of lower than 5 grams per are fails to produce expected herbicidal effect.

The 3 - trifluoromethyl-2'-methyl-4'-chlorophenoxyacetanilide of this invention is formulated for herbicidal use either as dusts, wettable powders, grains, or concentrated emulsifiable solution. Depending upon the type of formulation for use, there is added any of the conventional carriers which include inactive carriers, such as talc, kaoline, bentonite, sericite, etc.; cationic, anionic, and nonionic surface active agents; spreaders, and organic solvents.

The herbicidal compositions containing said 3-trifluoromethyl-2'-methyl-4'-chlorophenoxyacetanilide as the main effective ingredient may be applied to the field of the corn plants either in the pre-emergent or in the post-emergent stage of growth thereof. But generally speaking, pre-emergent application is most desirable and effective, as the weeds are completely eliminated in their germinating or emergent stage and the growth of the weeds are completely inhibited until the harvest time of the corn. In pre-emergent application, the herbicidal composition is applied to the soil by spraying or soil incorporation. But it is desirable to apply the composition onto the surface of the soil.

In post-emergent application, the herbicidal composition of this invention is applied to the soil or the leaves of the corn plants to be protected and of the weeds to be eliminated. But it is desirable to apply the composition onto the surface of the soil, although it may be applied to the soil by soil incorporation.

Climatic conditions have hardly any substantial effect upon the herbicidal ability of the herbicidal compositions of this invention, namely said herbicidal compositions may be applied even at a temperature below 20° C. or under exceedingly damp conditions.

The weeds which can be eliminated with the herbicidal compositions of this invention include such broadleaf weeds as smartweed (*Polygonum blumei*), *Amaranthus albus*, *Chenopodium album*, common purslane (*Portulaca oleracea*), common chickweed (*Sterallia media*), ragweed (*Ambrosia artemisiifolia*), and the like, and such narrowleaf weeds as large crabgrass (*Digitaria sanguimalis*), goose grass (*Eleusine indica*), green foxtail (*Setaria viridis*), jointed flatsedge (*Cyperus microiria*), etc., but in general the broadleaf weeds can be more effectively eliminated by the process of the invention.

For a fuller understanding of this invention, various tests performed for herbicidal ability and chemical injury of the herbicidal compositions of this invention are given hereinafter.

(A) SELECTIVITY TESTS

Test 1.—Pre-emergent application

In an open box, 150 cm. by 20 cm. and 15 cm. deep, was laid soil. In the surface layer of this bed were planted 1 cm. deep corn, millet, rye, radish and tomato seeds, 10 to 20 grains each. Upon the surface of this layer was uniformly placed 5 mm. deep another layer of the same soil incorporating large crabgrass (*Digitaria sanguimalis*), green foxtail (*Setaria viridis*), jointed flatsedge (*Cyprus microiria*), smartweed (*Polygonum blumei*), *Amaranthus albus*, *Chenopodium album*, common purslane (*Portulaca oleracea*), common chickweed (*Sterallia media*), and ragweed (*Ambrosia artemisiifolia*) seeds, 10 grains each.

Two days after seeding, a wettable powder consisting of

| | Parts by wt. |
|---|---|
| 3 - trifluoromethyl - 2' - methyl-4'-chlorophenoxyacetanilide | 25 |
| Kaolin | 60 |
| Sodium dodecylbenzene sulfonate | 10 |
| Sodium ligninsulfonate | 5 | was diluted with water and uniformly sprayed onto the surface of the top layer in the order of 5 to 40 grams per are on the basis of the main effective ingredient. Examination was carried out for chemical damage on the crops 3 weeks after application and for herbicidal effects on the weeds 4 weeks after application. Findings are shown in Table 1 below.

Test 2.—Leaf application

Another trial bed containing crop and weed seeds was prepared in the same manner as described in Test 1, and the same solution as specified in Test 1 was sprayed onto the leaves 2 weeks after seeding in the range of 5 to 40 grams per are in terms of the main effective ingredient. The results of investigation obtained one week after application are also set forth in Table 1. The herbicidal effect rating scale used in Table 1 was as follows:

0: no effect; 1: slight effect; 2: moderate effect; 3: marked effect.

TABLE 1.—HERBICIDAL EFFECT RATING

| | Composition of this invention (grams/are) | | | | | | | | 2,4-D[1] (grams/are) | | | |
|---|---|---|---|---|---|---|---|---|---|---|---|---|
| | Pre-emergent | | | | Post-emergent | | | | Pre-emergent | | Post-emergent | |
| | 5 | 10 | 20 | 40 | 5 | 10 | 20 | 40 | 10 | 20 | 10 | 20 |
| Corn | 0 | 0 | 0 | 0 | 0 | 0 | 0 | 0 | 1 | 1 | 1 | 2 |
| Millet | 1 | 2 | 3 | 3 | 0 | 1 | 1 | 2 | 1 | 1 | 1 | 1 |
| Rye | 1 | 2 | 3 | 3 | 0 | 1 | 1 | 2 | 1 | 1 | 0 | 1 |
| Large crabgrass | 2 | 3 | 3 | 3 | 1 | 1 | 2 | 2 | 1 | 2 | 1 | 1 |
| Goose grass | 1 | 2 | 3 | 3 | 1 | 1 | 2 | 2 | 1 | 1 | 1 | 1 |
| Green foxtail | 1 | 2 | 3 | 3 | 0 | 1 | 2 | 2 | 1 | 1 | 0 | 1 |
| Jointed flatsedge | 3 | 3 | 3 | 3 | 1 | 2 | 3 | 3 | 0 | 1 | 0 | 1 |
| Radish | 2 | 3 | 3 | 3 | 1 | 2 | 3 | 3 | 2 | 3 | 3 | 3 |
| Tomato | 2 | 3 | 3 | 3 | 2 | 2 | 3 | 3 | 2 | 3 | 3 | 3 |
| Smartweed | 3 | 3 | 3 | 3 | 2 | 2 | 3 | 3 | 1 | 2 | 2 | 3 |
| *Amaranthus albus* | 3 | 3 | 3 | 3 | 2 | 3 | 3 | 3 | 2 | 3 | 3 | 3 |
| Goosefoot | 3 | 3 | 3 | 3 | 2 | 3 | 3 | 3 | 2 | 3 | 3 | 3 |
| Common purslane | 2 | 3 | 3 | 3 | 2 | 2 | 3 | 3 | 1 | 2 | 2 | 3 |
| Common chickweed | 3 | 3 | 3 | 3 | 2 | 2 | 3 | 3 | 2 | 3 | 3 | 3 |
| Ragweed | 3 | 3 | 3 | 3 | 3 | 2 | 3 | 3 | 2 | 3 | 3 | 3 |
| Narrowleaf | 2 | 2 | 3 | 3 | 1 | 1 | 2 | 2 | 1 | 1 | 1 | 1 |
| Broadleaf | 3 | 3 | 3 | 3 | 2 | 3 | 3 | 3 | 2 | 3 | 3 | 3 |

[1] 2,4-D: sodium 2,4-dichlorophenoxyacetate.

(B) INJURY TEST ON CORN

Test 3.—Pre-emergent soil surface broadcast application

A test plot previously infested with narrowleaf weeds, such as large crabgrass (*Digitaria sanguimalis*), goose grass (*Eleusine indica*), and green foxtail (*Setaria viridis*), and broadleaf weeds, such as smartweed (*Polygonum blumei*), common purslane (*Portulaca oleracea*), *Amaranthus albus*, and *Chenopodium album*, was seeded with corn. Three days after seeding, the solution prepared in the same manner as in Test 1 was sprayed onto the surface of the plot at rates varying from 5 to 40 grams per are in terms of the main effective ingredient.

Test 4.—Soil incorporation

Another plot previously infested with the same weeds as specified in Test 3 and seeded with corn was treated in the same manner as in Test 3. Following application, the herbicidal composition applied was uniformly incorporated into the soil by ploughing.

Test 5a.—Post-emergent application—1

Another plot previously infested with the same weeds as specified in Test 3 was seeded with corn. When the crops and the weeds reached the 3 to 4 leaf stage about 4 weeks after seeding, the herbicidal solution as prepared in the same manner as in Test 1 was applied to the corn plants by soil application and to the weeds by leaf application.

Test 5b.—Post-emergent application—2

Another plot previously infested with the same weeds as specified in Test 3 was seeded with corn. When the crops and the weeds reached the 3 to 4 leaf stage, the weeds were mown with the weeder, and the herbicidal solution as prepared in the same manner as in Test 1 was applied to the soil as in Test 5a.

The results of Test 3 to 5 were all examined 3 weeks after application for chemical injury on the corn plants and for herbicidal effects on the narrowleaf and broadleaf weeds. Findings are set forth in Table 2 below. The rating scales employed were:

Percent herbicidal effect:

Number of weeds in untreated plot—

$$\frac{\text{number of weeds in treated plot}}{\text{Number of weeds in untreated plot}} \times 100$$

Chemical injury upon the corn plants:
—: no injury; +: slight injury; ++: moderate injury; +++: severe injury.

of said herbicidal compound to be applied ranges from 7 to 20 grams per are.

3. The method of selectively inhibiting the growth of weeds as claimed in claim 1, wherein said herbicidal compound is applied to the soil before the germination of the seeded corn.

4. The method of selectively inhibiting the growth of weeds as claimed in claim 3, wherein said herbicidal compound is applied onto the soil surface.

5. The method of selectively inhibiting the growth of weeds as claimed in claim 1, wherein said herbicidal compound is applied to the corn-growing area after germination of the corn plants.

6. The method of selectively inhibiting the growth of weeds as claimed in claim 5, wherein said herbicidal compound is applied onto the soil surface.

7. The method of selectively inhibiting the growth of weeds as claimed in claim 5, wherein said herbicidal compound is applied to the corn-growing area during the growing period of the corn plants.

8. The method of selectively inhibiting the growth of weeds as claimed in claim 7, wherein said herbicidal compound is applied to the corn-growing area during the growing period of the corn plants and pre- and early post-emergent period of the weeds.

9. The method of selectively inhibiting the growth of weeds as claimed in claim 7, wherein said herbicidal compound is applied onto the soil surface.

TABLE 2: HERBICIDAL EFFECT AND INJURY ON CORN PLANTS

| Test | Composition | Grams per are | Herbicidal effect (percent) Narrow leaf | Herbicidal effect (percent) Broad leaf | Injury on corn | Remarks on injury |
| --- | --- | --- | --- | --- | --- | --- |
| 3 | Composition of this invention | 5 | 90 | 100 | — | No injury. |
|  |  | 10 | 100 | 100 | — | Do. |
|  |  | 20 | 100 | 100 | — | Do. |
|  |  | 40 | 100 | 100 | — | Do. |
|  | DCMU [1] | 20 | 100 | 100 | ++ | Chlorosis formed on sprouts; poor growth. |
|  | SES [2] | 20 | 70 | 100 | + | Most leaves deformed; marked fall in yields. |
| 4 | Composition of this invention | 5 | 0 | 40 | — | No injury. |
|  |  | 10 | 60 | 70 | — | Do. |
|  |  | 20 | 90 | 95 | — | Do. |
|  |  | 40 | 100 | 100 | — | Do. |
|  | DCMU | 20 | 95 | 95 | +++ | Died after sprouting. |
|  | SES | 20 | 80 | 100 | ++ | Most leaves deformed; poor growth. |
| 5a | Composition of this invention | 5 | 0 | 70 | — | No injury. |
|  |  | 10 | 0 | 80 | — | Do. |
|  |  | 20 | 80 | 100 | — | Do. |
|  |  | 40 | 100 | 100 | — | Do. |
|  | DCMU | 20 | 50 | 50 | + | Growth slightly inhibited; slight fall in yields. |
|  | SES | 20 | 10 | 30 | + | Sprouts deformed; slight fall in yields. |
| 5b | Composition of this invention | 5 | 70 | 85 | — | No injury. |
|  |  | 10 | 90 | 100 | — | Do. |
|  |  | 20 | 100 | 100 | — | Do. |
|  |  | 40 | 100 | 100 | — | Do. |
|  | DCMU | 20 | 100 | 100 | + | Growth slightly inhibited; slight fall in yields. |
|  | SES | 20 | 80 | 100 | + | Sprouts deformed; slight fall in yields. |

[1] DCMU: N-(3,4-dichlorophenyl)-N',N'-dimethylurea.
[2] SES: sodium 2-(2,4-dichlorophenyl) ethanesulfate.

We claim:
1. Method of selectively inhibiting the growth of the undesirable weeds until the harvest time of corn, which comprises applying to the corn-growing area 3-trifluoromethyl - 2' - methyl - 4' - chlorophenoxyacetanilide of the formula:

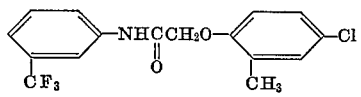

in the range of 5 to 40 grams per are.

2. The method of selectively inhibiting the growth of weeds as claimed in claim 1, wherein the effective amount

References Cited

UNITED STATES PATENTS 3,439,018  4/1969  Brookes et al. _____ 71—118 X
3,414,400  12/1968  Watonabe et al. _____ 71—118

OTHER REFERENCES

Thompson et al., Botanical Gazette, vol. 107, pp. 476–501 (pages 479–482, 486, 490, 494, 495, 497–500, 503, 505–506 particularly relied upon), 1946.

JAMES O. THOMAS, JR., Primary Examiner